(12) United States Patent
Kennedy

(10) Patent No.: US 7,451,752 B2
(45) Date of Patent: *Nov. 18, 2008

(54) INDUCTION REGULATOR FOR AN INTERNAL COMBUSTION ENGINE

(76) Inventor: Roger Kennedy, 152 Bury New Road, Whitfield, Lancashire M45 6AD (GB)

(*) Notice: Subject to any disclaimer, the term of this patent is extended or adjusted under 35 U.S.C. 154(b) by 0 days.

This patent is subject to a terminal disclaimer.

(21) Appl. No.: 11/645,077

(22) Filed: Dec. 21, 2006

(65) Prior Publication Data

US 2007/0215129 A1 Sep. 20, 2007

Related U.S. Application Data

(63) Continuation of application No. 10/474,945, filed as application No. PCT/GB02/01831 on Apr. 19, 2002, now Pat. No. 7,171,959.

(30) Foreign Application Priority Data

Apr. 19, 2001 (GB) ................... 0109623.9
Jun. 15, 2001 (GB) ................... 0114573.9

(51) Int. Cl.
F02M 29/04 (2006.01)
(52) U.S. Cl. ................... 123/592; 123/590; 123/593
(58) Field of Classification Search ......... 123/590–593, 123/549
See application file for complete search history.

(56) References Cited

U.S. PATENT DOCUMENTS

| 1,509,694 | A | 9/1924 | Silver |
| 3,544,290 | A | 12/1970 | Larson, Sr. |
| 3,945,361 | A | 3/1976 | Piotrowicz, Sr. |
| 3,952,716 | A | 4/1976 | McCauley |
| 3,955,548 | A | 5/1976 | Thomas, Jr. |
| 4,059,082 | A * | 11/1977 | McCauley ................... 123/549 |
| 4,106,454 | A | 8/1978 | Henlis |
| 4,163,436 | A | 8/1979 | Fugett |
| 4,342,303 | A | 8/1982 | McCord |
| 4,361,128 | A | 11/1982 | Goldman et al. |
| 4,478,607 | A | 10/1984 | Capps |
| 4,711,222 | A | 12/1987 | Rawlings |
| 5,388,559 | A * | 2/1995 | O'Keefe ....................... 123/593 |
| 5,568,800 | A | 10/1996 | Einaudi et al. |

FOREIGN PATENT DOCUMENTS

EP 0 854 283 A2 7/1998
GB 2 099 074 A 12/1982

* cited by examiner

*Primary Examiner*—M. McMahon
(74) *Attorney, Agent, or Firm*—Waddey & Patterson, P.C.; Emily A. Shouse

(57) ABSTRACT

The invention relates to an induction regulator (201) for an internal combustion engine which comprises one or more features selected from: at least one perforated element (203) for allowing the passage of fuel/air mixture therethrough, at least one open-topped reservoir (205) for retaining excess unvapourised fuel and means (204) for mounting the regulator in the inlet manifold of an engine, the open-topped reservoir (205) comprising a series of perforations (207) therein; at least one perforated element for allowing the passage of fuel/air mixture therethrough, means for mounting the perforated element in the inlet manifold of an engine and the means (510) for heating the perforated element; and a propeller and means for mounting the propeller (703, 803, 903) in the inlet manifold of an engine.

8 Claims, 3 Drawing Sheets

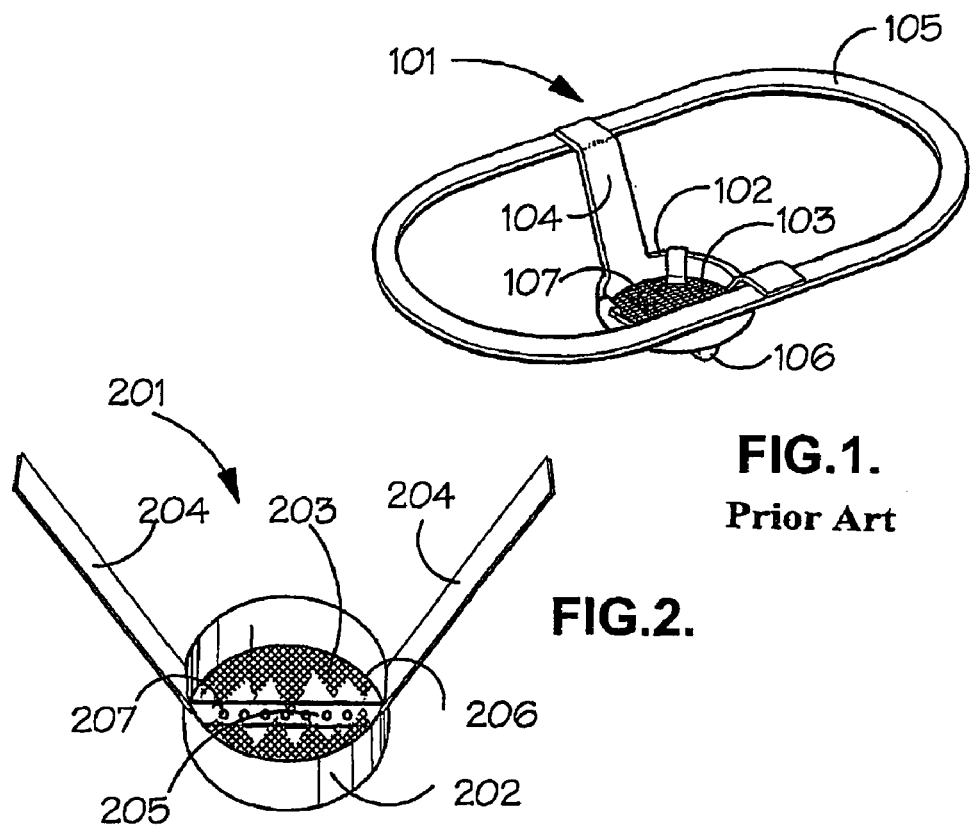
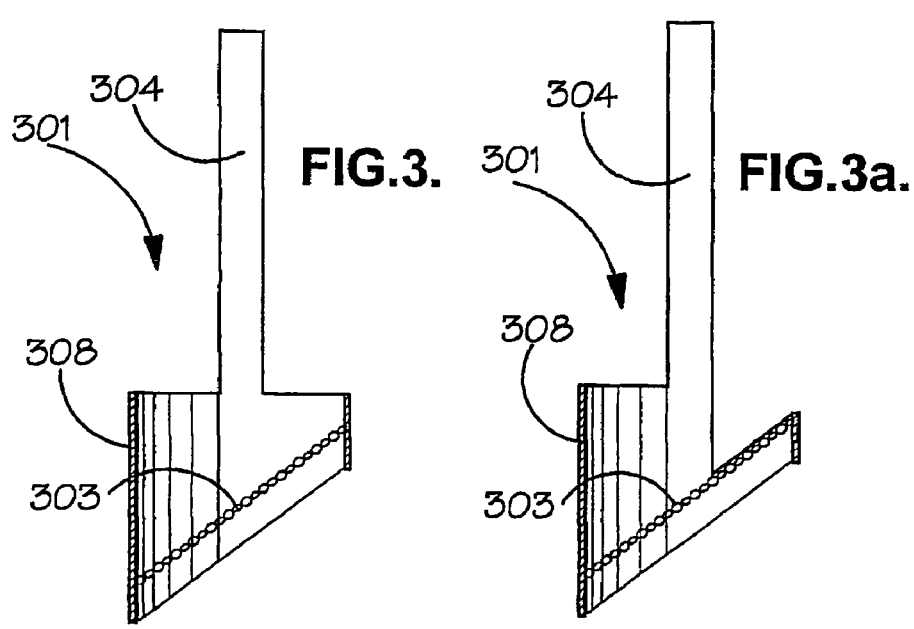
FIG.1.
Prior Art
FIG.2.
FIG.3.   FIG.3a.

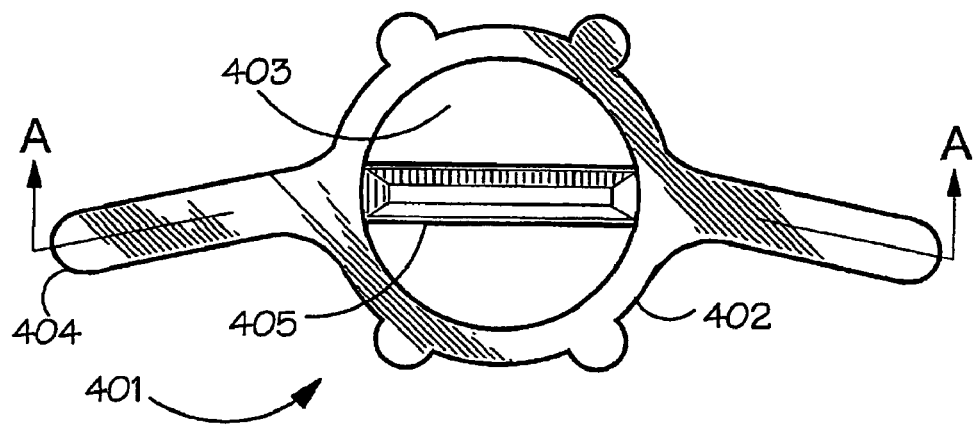
FIG.4.
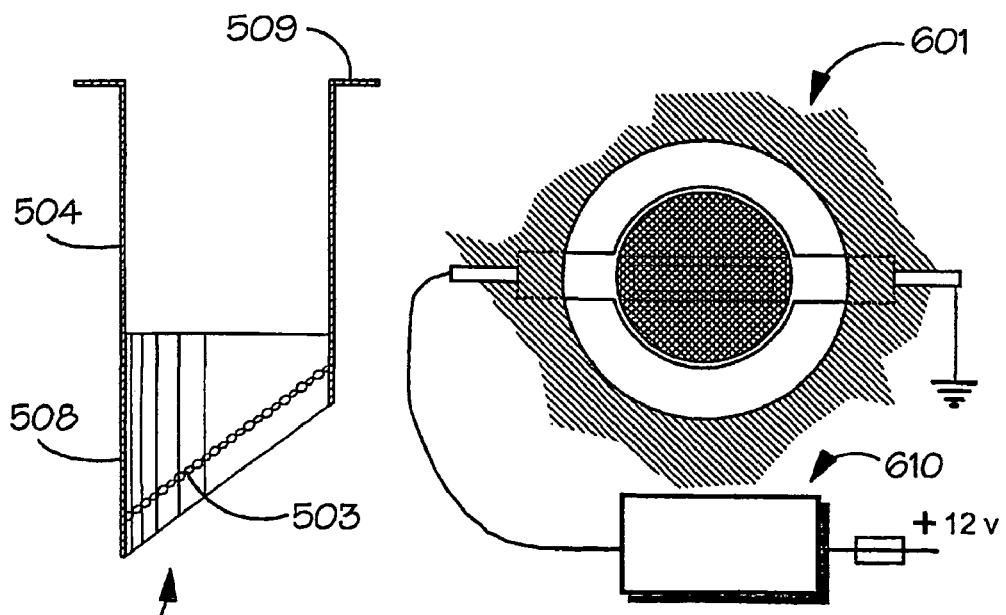
FIG.5.
FIG.6.

INDUCTION REGULATOR FOR AN INTERNAL COMBUSTION ENGINE

CROSS-REFERENCES TO RELATED APPLICATIONS

This application is a continuation application which claims benefit of U.S. patent application Ser. No. 10/474,945 filed Oct. 15, 2003, now U.S. Pat. No. 7,171,959 entitled "Induction Regulator For An Internal Combustion Engine", which is a 371 application of PCT/GB02/01831 filed Apr. 19, 2002, which claims benefit of U.K. Patent Application No. 0109623.9 filed Apr. 19, 2001 and U.K. Patent Application No. 0114573.9 filed Jun. 15, 2001, which are hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an induction regulator for an internal combustion engine.

An induction regulator is known from UK-A-2099074 which is designed to compensate for irregularities in the supply to and demand for fuel from the engine and thus leads to improved fuel consumption, reduced exhaust pollution, and better fuel atomization/vaporization. For this purpose this known regulator is adapted to be disposed in the inlet manifold of the engine, downstream of the carburettor and comprises a perforated element allowing the passage of fuel/air mixture therethrough, an open-topped reservoir for retaining excess unvaporized fuel and a pair of mounting straps depending from the perforated element for fixing the regulator within the manifold. The ends of the straps may be bent outwardly at right angles in order to permit them to be clamped between the inlet manifold and the carburetor. The perforated element is disposed at an angle to the straps such that when the regulator is installed the perforated element is disposed at a defined angle to the manifold wall in order to optimize atomization.

Another known induction regulator is disclosed in UK-A-2270952 which describes an induction regulator for an internal combustion engine comprising a perforated element for allowing the passage of fuel/air mixture therethrough, at least one open-topped reservoir for retaining excess unvaporized fuel and a closed loop supporting strip coupled to the perforated element for mounting between opposed flanges of the manifold of the engine downstream of the carburetor.

Prior art induction regulators suffer from a number of disadvantages. For example, many prior art induction regulators are not sufficiently effective in promoting swirling promotion of the fuel/air mixture when passing therethrough. The performance of some prior art induction regulators is not optimized during engine start up procedure and for the first few minutes thereafter before the engine warms up. Some prior art induction regulators are difficult to fit and seal and some cannot be fitted to a multi-point system.

BRIEF SUMMARY OF THE INVENTION

It is an object of the present invention to provide an induction regulator for an internal combustion engine which overcomes or alleviates one or more of the aforesaid disadvantages.

In a first embodiment of the invention, there is provided an induction regulator for an internal combustion engine comprising at least one perforated element for allowing the passage of fuel/air mixture therethrough, at least one open-topped reservoir for retaining excess unvaporized fuel and means for mounting the regulator in the inlet manifold of an engine, the open-topped reservoir comprising a series of perforations therein.

The perforations in the open-topped reservoir enhance the swirling motion of the fuel/air mixture when passing therethrough and over the regulator which, in turn, improves atomization/vaporization of the fuel and enhances the performance of the engine. The perforations may be made by a mechanical drilling or by chemical application and are preferably provided on two opposed sidewalls of the open-topped reservoir.

In a second embodiment of the invention there is provided an induction regulator for an internal combustion engine comprising at least one perforated element for allowing the passage of fuel/air mixture therethrough and means for mounting the regulator in the inlet manifold of an engine, at least a portion of the perforated element being at least partially surrounded by a skirt, the height of the skirt being greater at one site of the perforated element than at another. In one such embodiment, the height of the skirt is greater on one side of the perforated element than on the other. Preferably, the induction regulator according to this second embodiment of the invention further comprises an open-topped reservoir for retaining excess unvaporized fuel. When present, the open-topped reservoir may be provided with a series of perforations therein.

According to this second embodiment of the invention, when the induction regulator is mounted in the inlet manifold of an internal combustion engine such that the perforated element is tilted at an angle, as is described in GB-A-2270952, the downwardly tilted side of the perforated element is provided with the skirt of greater height. In this way, when the regulator is in use, the top of the skirt effectively remains un-tilted with respect to the inlet manifold. This has the effect of improving the swirling motion of the fuel/air mixture passing through and over the regulator, with consequent improvement in engine performance.

In a third embodiment of the invention there is provided an induction regulator for an internal combustion engine comprising at least one perforated element for allowing the passage of fuel/air mixture therethrough and means for mounting the perforated element in the inlet manifold of an engine, the means for mounting comprising supporting straps secured at one end to the perforated element and comprising at each other end a flange angled with respect to each strap, the length of each strap being selected to be approximately half of the peripheral length of the perforated element. Preferably, the induction regulator according to this third embodiment of the invention further comprises an open-topped reservoir for retaining excess unvaporized fuel. Where present, the open-topped reservoir may be provided with a series of perforations. The induction regulator according to this second embodiment of the invention may also, or instead, be provided with a skirt at least partially surrounding at least a portion of the perforated element, the height of the skirt being greater at one site of the perforated element than at another.

In this third embodiment of the invention, the ratio of supporting strap length to perforated element peripheral length has been found to define the optimum position of the regulator within the inlet manifold. This renders the regulator of the invention easier to fit in an optimum fashion than prior art devices.

According to a fourth embodiment of the invention there is provided an induction regulator for an internal combustion engine comprising at least one perforated element for allowing the passage of fuel/air mixture therethrough and means for mounting the perforated element in the inlet manifold of an engine, the means for mounting comprising supporting straps secured at one end to the perforated element and having at each other end a flange angled with respect to each respective strap, the flanges being manufactured from a malleable material. Preferably, the induction regulator according to this fourth embodiment of the invention further comprises an open-topped reservoir. Where present, the open-topped reservoir may be provided with a series of perforations. The induction regulator according to this fourth embodiment of the invention may also, or instead, be provided with a skirt at least partially surrounding at least a portion of the perforated element, the height of the skirt being greater at one site of the perforated element than at another. The length of each supporting strap is preferably selected to be approximately half of the peripheral length of the perforated element.

This fourth embodiment of the invention has the advantage that, when fitting the regulator in the inlet manifold, the regulator is simply placed on top of the engine gasket or spacer gasket with its uppermost point in line with the forward edge of the butterfly/mono-point injector of the carburettor/mono-point injection body. A small amount of gasket sealant is put around each of the flanges that fill the gasket area. The carburettor/mono-body is then replaced onto the inlet manifold and torqued to the manufacturers' specifications. Because the flanges are made from malleable material, the torquing down will cause the material to spread onto the gasket thereby assuring a good seal and preventing air/fuel leakage ether inward or outward. Preferably, the malleable material is soft copper.

According to a fifth embodiment of the invention there is provided an induction regulator for an internal combustion engine comprising at least one perforated element for allowing the passage of fuel/air mixture therethrough, means for mounting the perforated element in the inlet manifold of an engine and means for heating the perforated element. Preferably, the heating means are independent of the temperature of the fuel/air mixture in the internal combustion engine in which the regulator is installed, in use of the regulator. The perforated element may be heated directly, for example by means of direct electrical contact between the perforated element and a battery. Alternatively, the heating may be provided indirectly, for example by electrical connection of a battery with the inlet manifold in which the induction regulator according to this fifth embodiment of the invention is installed, in use of the regulator. This may be advantageous in helping to vaporise any liquid fuel in the inlet manifold. Preferably, the induction regulator according to this fifth embodiment of the invention further comprises an open-topped reservoir for retaining excess unvaporized fuel. Where present, the open-topped reservoir may be provided with a series of perforations. Alternatively, or as well, the induction regulator according to this fifth embodiment of the invention may be provided with a skirt at least partially surrounding at least a portion of the perforated element, the height of the skirt being greater at one site of the perforated element than at another. The induction regulator according to this fifth embodiment of the invention may additionally, or instead be provided with supporting straps for mounting the perforated element in the inlet manifold, the supporting straps being secured at one end to the perforated element and comprising at each other end a flange angled with respect to each strap, the length of each strap being selected to be approximately half of the peripheral length of the perforated element. The straps, where present may alternatively, or as well, be manufactured from a malleable material such as soft copper. The heating means may be connected to the straps instead of, or in addition to, the perforated element.

According to this fifth embodiment of the invention, the regulator can be pre-heated prior to or at engine start-up to optimize performance thereof during the initial stages of engine operation. This provides a significant advantage over prior art devices in which the regulator only becomes heated in use as the engine warms up. Preferably, the heating means comprises electrical heating means.

In a preferred embodiment of the invention, the regulator comprises two perforated elements. With this arrangement, a regulator can be placed down stream of each choke of, say, a twin choke carburettor which feeds into a single inlet manifold.

Preferably, the or each perforated element comprises a metal gauze bounded by a frame, the shape of which corresponds with that of the inlet manifold into which the regulator is to be fitted. The frame and perforated element therein are preferably selected for size to leave a peripheral gap between the frame and the inlet manifold when the regulator is mounted therein. Preferably, the gauze is planar and disposed at an angle to the manifold wall in use of the regulator. The angle may be in the range of from about 13° to about 25° but is preferably about 18° when the regulator is positioned at a bend in the manifold, for example where the inlet gas is changed directly between moving vertically and moving horizontally, as is the case with a down-draft carburetor.

Where present, the or each open-topped reservoir may comprise a rectangular tank which is secured to or forms part of the frame at the open top is positioned adjacent the gauze on the down stream side thereof. The tank preferably extends across the width of the gauze in a central position leaving unrestricted passage through the gauze both above and below its longitudinal edges. The arrangement is such that unvaporized fuel collects in the tank and, when the engine requires extra fuel it vaporizes from this tank passing initially upstream through the gauze covering the open top of the tank and then down stream through the gauze positioned on either side of the tank. The gauze serves to improve atomization of the fuel/air mixture and, by virtue by the turbulent created, generates a swirling action in the inlet manifold which leads to improved combustion.

According to a sixth embodiment of the invention there is provided an induction regulator for an internal combustion engine comprising a propeller and means for mounting the propeller in the inlet manifold of an engine.

As fuel/air mixture passes through the inlet manifold, the propeller is caused to rotate. Rotation of the propeller promotes swirling motion of the fuel/air mixture passing through the inlet manifold and improves engine performance as a result.

The propeller may be mounted in the inlet manifold by means of mounting straps secured at one end to the propeller and each other end to the inlet manifold or to an engine gasket in the region thereof. The propeller may be perforated. The propeller may also be heated, directly or indirectly, by heating means which are preferably independent of the temperature of the fuel/air mixture in the internal combustion engine, for example by means of a battery power supply.

The propeller may be unpowered, so as to rotate under the influence fuel/air mixture passing there against. Alternatively, the propeller may be connected to a suitable power supply, such as an electric power supply, thereby its rotate by its own accord. In this case the propeller may be driven at any number of different, controlled speeds. The propeller may operate independently in the inlet manifold as an induction regulator, or it may be combined with an induction regulator of the type described, for example, in GB-A-2270952. In this case the sixth embodiment of the invention provides an induction regulator for an internal combustion engine comprising at least one perforated element for allowing the passage of fuel/air mixture therethrough, a propeller and means for mounting the at least one perforated element and the propeller in the inlet manifold of an engine. Optionally, the induction regulator may further comprise at least one open-topped reservoir for retaining excess unvaporized fuel. In this case, the open-topped reservoir may be provided with a series of perforations. Optionally, the propeller may be connected to a power supply.

In this case, the propeller may be mounted as mentioned above in the inlet manifold or maybe secured to the at least one perforated element.

Further provided in accordance with this sixth embodiment of the invention is an induction regulator for an internal combustion engine comprising at least one perforated element for allowing the passage of fuel/air mixture therethrough, a propeller and means for mounting the at least one perforated element and the propeller in the inlet manifold of an engine, at least a portion of the perforated element being at least partially surrounded by a skirt, the height of the skirt being greater at one site of the perforated element than at another. In one such embodiment, the height of the skirt is greater on one side of the perforated element than on the other. Preferably, the induction regulator according to this embodiment of the invention further comprises an open-topped reservoir for retaining excess and vaporized fuel. Where present, the open-topped reservoir may be provided with a series of perforations.

Further provided in accordance with this sixth embodiment of the invention is an induction regulator for an internal combustion engine comprising at least one perforated element for allowing passage fuel/air mixture therethrough, a propeller and means for mounting the perforated element and the propeller in the inlet manifold of an engine, the mounting means comprising supporting straps secured at one end to the perforated element and/or the propeller and comprising at each other end a flange angled with respect to each strap, the length of each strap being selected to be half of the peripheral length of the perforated element.

The invention further provides an induction regulator for an internal combustion engine comprising at least one perforated element for allowing the passage of fuel/air mixture therethrough, a propeller and means for mounting the perforated element and the propeller in the inlet manifold of an engine, the mounting means comprising supporting straps secured at one end to the perforated element and/or the propeller and having at each other end a flange angled with respect to each respective strap, the flanges being manufactured from a malleable material.

Also provided in accordance with the invention is an induction regulator for an internal combustion engine comprising at least one perforated element for allowing the passage of fuel/air mixture therethrough, a propeller and means for mounting the perforated element and the propeller in the inlet manifold of an engine and means for heating the perforated element and/or the propeller.

In preferred embodiments of the invention, the regulator comprises two propellers to start with this arrangement a regulator can be placed downstream of each choke of, say, a twin-choke carburettor which feeds into a single inlet manifold.

Preferably, the or each propeller is of metal construction (although other suitable materials, including plastics materials, may be used) and is sized to correspond with the size of the inlet manifold into which the regulator is to be fitted. Preferably, the size of the propeller is selected to leave a peripheral gap between the propeller and the inlet manifold when the regulator is fitted.

The propeller may also be used in an injector system. For example, the propeller can be attached to one or more injectors in such a system to.

Where present, the perforated element which features in some embodiments of the invention may be sized to leave a peripheral gap between the perforated element and the inlet manifold when fitted.

The induction regulators according to each embodiment of the invention may conveniently be installed as an integral part of the manufacture of an internal combustion engine. However, they may also be retro-fitted to existing engines. In either case, the induction regulators of the invention may be manufactured as single sealed units to facilitate installation.

The induction regulators of the invention are suitable for use in all types of internal combustion engine, including automobile, motorbike and lawnmower engines.

BRIEF DESCRIPTION OF THE SEVERAL VIEWS OF THE DRAWINGS

By way of example only, specific embodiment of the present invention will now be described with reference to the accompanying drawings, in which:

FIG. 1 is a perspective view illustrating a regulator in accordance with GB-A-2270952;

FIG. 2 is a schematic view of a regulator constructed in accordance with the first embodiment of the invention hereinbefore described;

FIGS. 3 and 3a are schematic views of regulators constructed in accordance with the second embodiment of the invention hereinbefore described;

FIG. 4 is a schematic view of a regulator constructed in accordance with the third embodiment of the invention hereinbefore described;

FIG. 5 is a schematic view of a regulator constructed in accordance with a fourth embodiment of the invention hereinbefore described;

FIG. 6 is a schematic view of a regulator constructed in accordance with a fifth embodiment of the invention hereinbefore described;

DETAILED DESCRIPTION OF THE INVENTION

Figure 7:
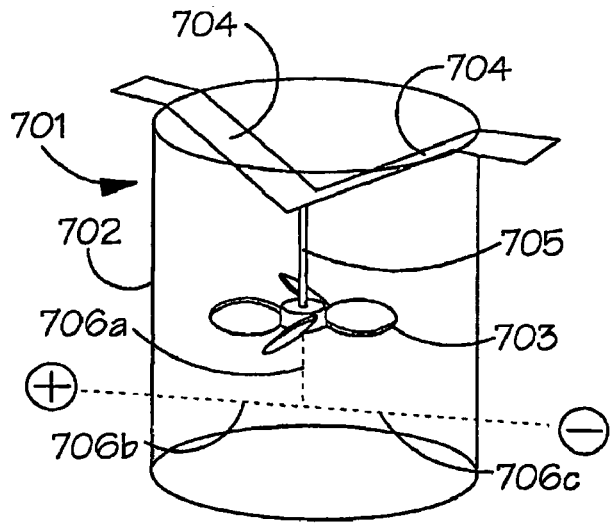
FIG. 7 is a schematic view of a regulator constructed in accordance with a sixth embodiment of the invention hereinbefore described.

With reference to FIG. 1, a prior art induction regulator 101 for disposal in the inlet manifold of an engine downstream of a carburettor is shown. The regulator comprises frame 102 which bounds metal gauze 103 and which acts to support gauze 103 around its periphery. Two strips of metal 104 extend from frame 102. Strips 104 are secured at their ends remote from frame 102 to a continuous strip of metal 105. Continuous strips 105 can be clamped between the flanges of the inlet manifold and of the carburettor in use of the regulator. Frame 102 is disposed at an angle to strips 5 and preferably at an angle of about 72°. An open-topped reservoir is secured to frame 102 and its edges surrounding the open top are formed with lip 107 which serves to support gauze 103. Reservoir 106 is elongate and is positioned centrally across the width of gauze 103, between the points where strips connect to frame 102. Gauze 103 extends over the top of reservoir 106. The reservoir serves as a drip tank to catch and retain any unvapourised fuel in the induction mixture.

Referring now to FIG. 2 there is shown induction regulator 201 for disposal in induction manifold of an engine downstream of a carburettor. Regulator 201 comprises frame 202 which bounds metal gauze 203 and which acts to support gauze 203 around its periphery. Two strips of metal 204 extend from frame 202. Strips 204 can be clamped between the flanges of an inlet manifold and of a carburetor.

Open-topped reservoir 205 is secured to frame 202 and its edges surrounding the open top are formed with lip 206 which serves to support gauze 203. Reservoir 205 is elongate and is positioned centrally across the width of gauze 203 between the points were strips 204 connect to frame 202. Gauze 203 extends over the open top of reservoir 205. Reservoir 205 serves as a drip tank to catch and retain any unvapourised fuel in the induction mixture. The side walls of reservoir 205 are provided with a series of perforations 207 which enhance the swirling action generated in the fuel/air mixture as it passes through or over induction regulator 201.

Referring now to FIG. 3, there is shown induction regulator 301 for disposal in the inlet manifold of an engine downstream of a carburettor. Regulator 301 comprises gauze 303 supported by metal strips 304 and circumferenced by skirt 308. Gauze 303 is tilted with respect to the inlet manifold in use of the regulator and the top of skirt 308 has an even height with respect to the inlet manifold, which improves the swirling action of the fuel/air mixture passing through gauze 303 in use of the device. In this embodiment of the invention, it is not necessary to provide an open-topped reservoir beneath gauze 303, although one can be provided if desired in similar fashion to that described with reference to FIG. 2.

Skirt 308 may only partially surround perforated element 303, as is shown in FIG. 3a.

Referring now to FIG. 4, there is shown induction regulator 401 for disposal in the inlet manifold of an engine downstream of a carburettor. Regulator 401 comprises frame 402 surrounding gauze 403. Open-topped reservoir 405 is situated beneath gauze 403. Frame 402 supports a pair of metal strips 404 which extend upwardly and somewhat outwardly in use of the device to the extent of about 50% of the circumference of gauze 403.

Referring now to FIG. 5, there is shown induction regulator 501 for mounting in the inlet manifold of an engine downstream of a carburettor. Regulator 501 comprises gauze 503 surrounded by skirt 508 and supported by two metal strips 504 which have opposed supporting lugs 509 made from a malleable material which, in this example, is soft copper.

Referring now to FIG. 6 there is shown induction regulator 601 for mounting in the inlet manifold of an engine downstream of a carburettor. Induction regulator 601 is connected to electrical heating means 610.

Referring now to FIG. 7 there is shown induction regulator 701 for disposal in the inlet manifold 702 of an engine downstream of a carburettor. Regulator 701 comprises propeller 703 mounted centrally within inlet manifold 702 by means of mounting straps 704. Propeller 703 is freely rotatable about center pin 705, to which mounting straps 704 are connected. Dotted lines 706 a, b and c indicate the optional presence of a connection of propeller 703 to an electric motor (not shown) for driving propeller 703 independently of the fuel/air mixture passing there against in use of regulator 701.

Figure 8:
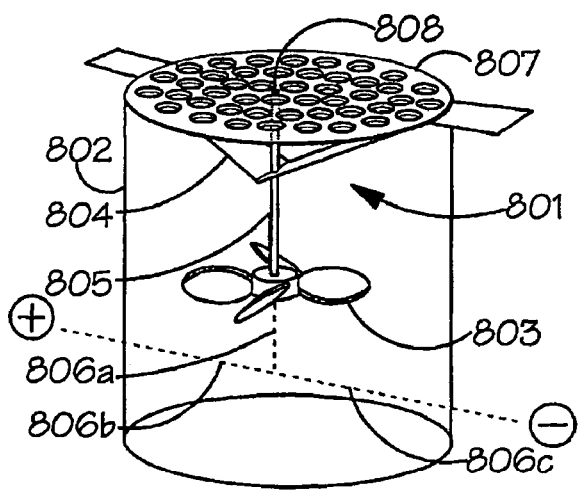
FIG. 8 is a schematic view of another regulator constructed in accordance with the sixth embodiment of the invention hereinbefore described.

Referring now to FIG. 8 there is shown an induction regulator 801 disposed in the inlet manifold 802 of an engine downstream of a carburettor. Induction regulator 801 comprises a propeller 803 mounted beneath perforated plate 807 in inlet manifold 802. Perforated plate 807 may alternatively be a gauze and is preferably made of metal material and supported in the inlet manifold 802 by means of mounting straps (not shown). Perforated plate 807 may be mounted at a tilt inside inlet manifold 802 and may be sized to leave a peripheral gap between perforated plate 807 and inlet manifold 802. Propeller 803 is freely rotatable about central pin 805 which is supported in inlet manifold 802 by means of a spot weld 808 on perforated plate 807. Alternatively, propeller 803 may be mounted by means of mounting straps 804. Dotted lines 806 a, b and c indicate an optional variation in which propeller 803 is connected to an electric motor (not shown) for driving rotation of the propeller independently of the fuel/air mixture passing there against.

Figure 9:
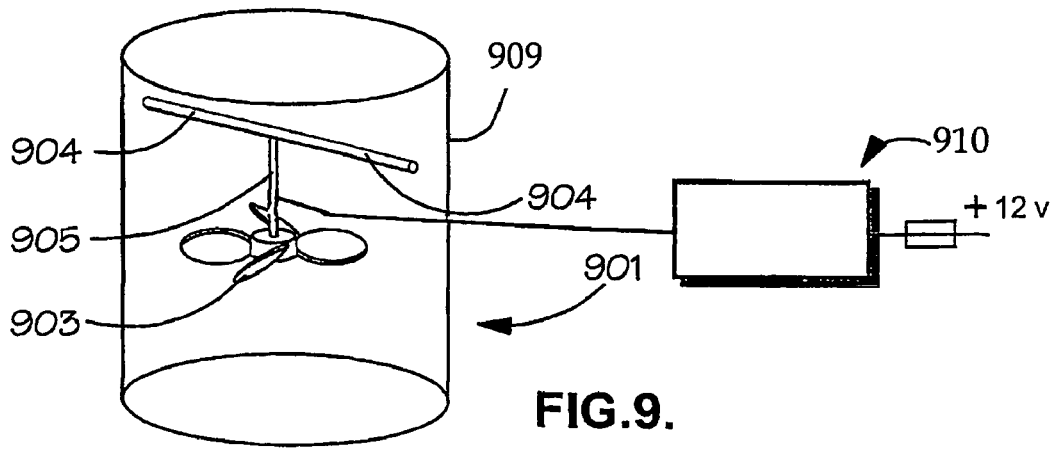
FIG. 9 is a schematic view of a further regulator constructed in accordance with the sixth embodiment of the invention hereinbefore described.

Referring to FIG. 9, there is shown an induction regulator 901 comprising propeller 903 mounted in sheath 909. Sheath 909 can be fitted in around a fuel line (not shown) so that propeller 903 is disposed within the fuel line in use of the regulator. Propeller 903 is freely rotatable about vertical pin 905 which is supported in sheath 909 by horizontal pins 904 spot welded to the wall of sheath 909.

Thus, although there have been described particular embodiments of the present invention of a new and useful "Induction Regulator For An Internal Combustion Engine", it is not intended that such references be construed as limitations upon the scope of this invention except as set forth in the following claims.

What is claimed is:

1. An induction regulator for an internal combustion engine comprising at least one perforated element for allowing the passage of fuel/air mixture therethrough, the perforated element being mounted at a tilt inside the inlet manifold and sized to leave a peripheral gap between the perforated plate and the inlet manifold, a propeller connected to a power supply for driving the propeller, means for mounting the at least one perforated element and the propeller beneath the perforated element in the inlet manifold of an engine, and means for heating the propeller.

2. An induction regulator according to claim 1 further comprising means for heating the perforated element.

3. An induction regulator according to claim 2 wherein the means for heating is connected directly to the perforated element.

4. An induction regulator according to claim 2 wherein the means for heating is indirectly connected to the perforated element.

5. An induction regulator according to claim 1 wherein the means for heating comprises a battery power supply.

6. An induction regulator according to claim 1 wherein the means for heating is independent of the temperature of the fuel/air mixture passing through the internal combustion engine, in use of the regulator.

7. An induction regulator according to claim 1 wherein the means for heating is connected directly to the propeller.

8. An induction regulator according to claim 1 wherein the means for heating is indirectly connected to the propeller.

* * * * *